United States Patent
Kobyakov

(10) Patent No.: US 9,720,889 B1
(45) Date of Patent: Aug. 1, 2017

(54) SYSTEMS AND METHODS FOR DETECTING AUTO-REDIRECTING ONLINE CONTENT

(71) Applicant: Google Inc., Mountain View, CA (US)

(72) Inventor: Pavel Kobyakov, Waterloo (CA)

(73) Assignee: Google Inc., Mountain View, CA (US)

(*) Notice: Subject to any disclaimer, the term of this patent is extended or adjusted under 35 U.S.C. 154(b) by 308 days.

(21) Appl. No.: 14/328,394

(22) Filed: Jul. 10, 2014

(51) Int. Cl.
*G06F 17/22* (2006.01)
*G06Q 30/02* (2012.01)

(52) U.S. Cl.
CPC ..... *G06F 17/2247* (2013.01); *G06Q 30/0275* (2013.01)

(58) Field of Classification Search
CPC .................. G06F 17/2247; G06Q 30/0275
See application file for complete search history.

(56) References Cited

U.S. PATENT DOCUMENTS

| | | | |
|---|---|---|---|
| 8,291,065 B2 | 10/2012 | Goodman et al. | |
| 8,429,751 B2 | 4/2013 | Mizrahi et al. | |
| 8,516,590 B1* | 8/2013 | Ranadive | H04L 63/1483 713/187 |
| 2008/0301281 A1* | 12/2008 | Wang | G06F 21/56 709/224 |
| 2011/0035800 A1* | 2/2011 | Atcha | G06F 21/566 726/22 |
| 2011/0191849 A1 | 8/2011 | Jayaraman et al. | |
| 2011/0219448 A1 | 9/2011 | Sreedharan et al. | |
| 2012/0290718 A1* | 11/2012 | Nethercutt | G06F 11/3006 709/224 |
| 2014/0068411 A1* | 3/2014 | Ross | G06F 17/00 715/234 |
| 2015/0162050 A1* | 6/2015 | Zhou | G11B 27/28 386/241 |

\* cited by examiner

*Primary Examiner* — Scott Baderman
*Assistant Examiner* — Seung Jung
(74) *Attorney, Agent, or Firm* — Fish & Richardson P.C.

(57) ABSTRACT

Systems and methods for checking for redirection of a content item are provided. A first web page identified by a first uniform resource locator (URL), the first web page comprising a content item. The first URL is stored in a memory element. After a predetermined period of time elapses, a second URL associated with a second web page rendered by the browser is identified. A discrepancy between the first URL and the second URL is detected. Responsive to the discrepancy detection, the content item is identified as ineligible for participation in an online auction system.

16 Claims, 8 Drawing Sheets

SYSTEMS AND METHODS FOR DETECTING AUTO-REDIRECTING ONLINE CONTENT

BACKGROUND

In a computerized content delivery network, first-party content providers can provide information for presentation of resources, such as web pages, documents, applications, and/or other resources. Additional third-party content can be presented on a device together with the first-party content. Thus, a user viewing a resource can access the first-party content that is the subject of the resource as well as the third-party content that may or may not be related to the subject matter of the resource. Certain third-party content may redirect the device to another resource different from the resource originally provided by the first party. However, a third-party content item should not automatically redirect the client device.

SUMMARY

One implementation of the present disclosure is a computer-implemented method for checking for redirection of a content item. The method may be performed by a processing circuit. The method includes rendering a first web page identified by a first uniform resource locator (URL), the first web page comprising a content item. A first URL of the first web page may be stored in a memory element. After a predetermined period of time elapses, a second URL associated with a second web page rendered by the browser may be identified if the first web page had performed a redirect to the second web page. A discrepancy between the first URL and the second URL may be detected. Responsive to the discrepancy detection, the content item may be identified as ineligible for participation in an online auction system.

Another implementation of the present disclosure is a system for checking for redirection of a content item. The system includes a web browser rendering a first web page identified by a first uniform resource locator (URL), the first web page comprising a content item. A URL manager stores the first URL in a memory element. A URL Comparer identifies a second URL associated with a second web page rendered by the browser after a predetermined period of time elapses if the first web page had performed a redirect to the second web page. The URL Comparer also detects a discrepancy between the first URL and the second URL. A Content Item Manager identifies, responsive to the discrepancy detection, the content item as ineligible for participation in an online auction system.

BRIEF DESCRIPTION OF THE DRAWINGS

Those skilled in the art will appreciate that the summary is illustrative only and is not intended to be in any way limiting. The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatus, and systems for providing information on a computer network. The various concepts introduced above and discussed in greater detail below may be implemented in any of numerous ways, as the described concepts are not limited to any particular manner of implementation. Specific implementations and applications are provided primarily for illustrative purposes.

Figure 1:
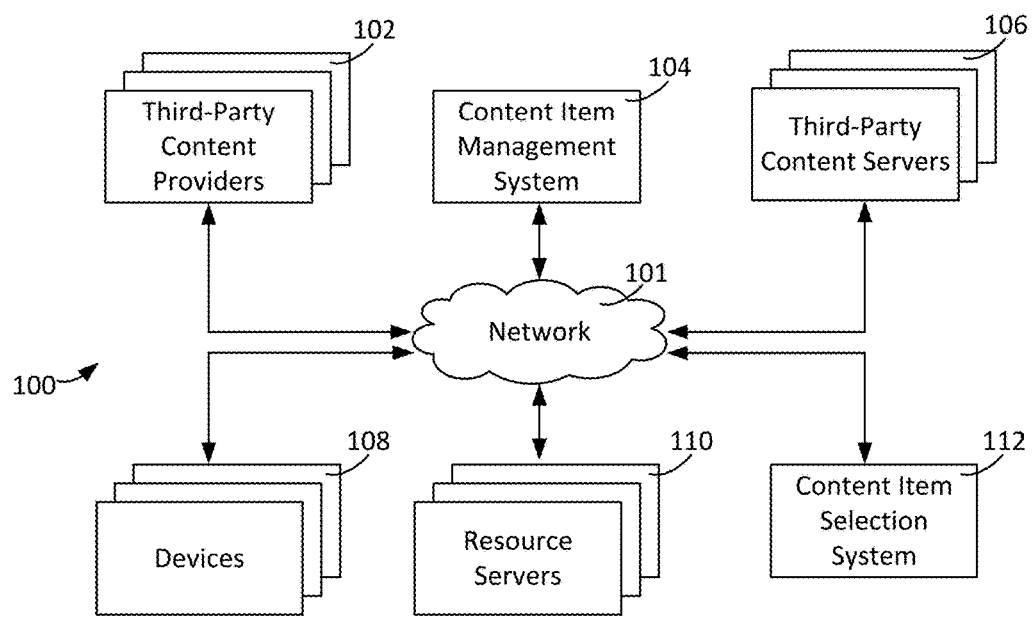
FIG. 1 is a block diagram of a computer system including a network, third-party content provider, content item management system, third-party content server, devices, resource servers, and content item selection system, according to a described implementation.

FIG. 1 is a block diagram of a computer system 100 including a network 101, third-party content providers 102, content item management system 104, third-party content servers 106, devices 108, resource servers 110, and content item selection system 112.

The system 100 may use at least one computer network 101. The network 101 may include a local area network (LAN), wide area network (WAN), a telephone network, such as the Public Switched Telephone Network (PSTN), a wireless link, an intranet, the Internet, or combinations thereof. The network 101 may connect one or more devices via an Open Systems Interconnection (OSI) model. In some implementation, the network 101 may use an internet protocol suite, including the Transmission Control Protocol (TCP) and the Internet Protocol (IP).

A third-party content provider 102 may be a computing device operated by an advertiser or any other content provider. The computing device can be a data processing system or have a data processor. The third-party content provider 102 may communicate with and provide a content item to the content item management system 104. In some implementations, the third-party content provider 102 may connect with the content item management system 104 to manage the selection and serving of content items by content item selection system 112. For instance, the third-party content provider 102 may set bid values and/or selection criteria via an interface that may include one or more content item conditions or constraints regarding the serving of content items. A third-party content provider 102 may specify that a content item and/or a set of content items should be selected for and served to devices 108 having device identifiers associated with a certain geographic location or region, a certain language, a certain operating system, a certain web browser, etc. In another implementation, the third-party content provider 102 may specify that a content item or set of content items should be selected and served when a resource, such as a web page, document, an application, etc., contains content item that matches or is related to certain keywords, phrases, etc. The third-party content provider 102 may set a single bid value for several content items, set bid values for subsets of content items, and/or set bid values for each content item. The third-party content provider 102 may also set the types of bid values, such as bids based on whether a user clicks on the third-party content item, whether a user performs a specific action based on the presentation of the third-party content item, whether the third-party content item is selected and served, and/or other types of bids.

The content item may be provided by the third-party content provider 102 to the content item management system 104. The content item may be in any format or type that may be presented on a device 108. The content item may also be a combination or hybrid of the formats. The content item may be specified as one of different format or type, such as text, image, audio, video, multimedia, etc. The content item may automatically redirect the device 108 to a different resource. The content item is discussed in greater detail in relation to FIG. 4.

A content item management system 104 can be a data processing system. The content item management system 104 can include at least one logic device, such as a computing device having a data processor, to communicate via the network 101, for instance with the third-party content providers 102, the third-party content servers 106, and the content item selection system 112. The content item management system 104 may be combined with or include one or more of the third-party content servers 106, the content item selection system 112, or the resource server 110. The one or more processors may be configured to execute instructions stored in a memory device to perform one or more operations described herein. In other words, the one or more data processors and the memory device of the content item management system 104 may form a processing module. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, ECMAScript®, Perl®, Hypertext Markup Language (HTML), Extensible Markup Language (XML), Python®, and Visual Basic®. In addition to the processing circuit, the content item management system 110 may include one or more databases configured to store data. A data storage device may be connected to the content item management system 104 through the network 101.

The content item management system 104 may receive the content item from one or more third-party content providers 102. The content item management system 104 may store the content item in the memory and/or the one or more databases. The content item management system 104 may provide the content item to the third-party content server 106 via the network 101. The content item management system 104 may provide a third-party content provider 102 a policy, which may be a set of rules associated with a content item provided by the third-party content provider 102. Each rule in the policy may be associated with a severity rating of a violation of that rule. A severity rating may be range of values, for instance zero to ten, or low, medium, high. For instance, a rule may be that a content item must not include automatic redirection, and a policy violation of that rule may be associated with a high severity rating. The content item management system 104 may check for policy violations by checking for violation of the set of rules. The content item management system 104 may check for redirection of a content item and identify the content item as ineligible for participation in an online auction system performed by the content item selection system 112. The content item management system 104 may also alert the third-party content provider 102. The content item management system 104 is described in greater detail in relation to FIG. 3.

The third-party content server 106 can include a computing device configured to store content items. The third-party content server 106 may be a computer server (e.g., a file transfer protocol (FTP) server, a file sharing server, a web server, a database server, etc.), a group or a combination of servers (e.g., a data center, a cloud computing platform, a server farm, etc.). The content server 106 may be any type of a computing device that includes a memory element configured to store content items and associated data. The third-party content servers 106 may include any type of non-volatile memory, media, or memory devices. For instance, third-party content servers 106 may include semiconductor memory devices (e.g., EPROM, EEPROM, flash memory devices, etc.) magnetic disks (e.g., internal hard disks, removable disks, etc.), magneto-optical disks, and/or CD ROM and DVD-ROM disks. In some implementations, third-party content servers 106 are local to content item management system 104, content item selection system 112, or resource server 110. In other implementations, third-party content servers 106 are remote data storage devices connected with content item management system 104 and/or content item selection system 112 via network 101. In some implementations, third-party content servers 106 are part of a data storage server or system capable of receiving and responding to queries from content item management system 104 and/or content item selection system 112. In some instances, the third-party content servers 106 may be integrated into the content item management system 104 or the content item selection system 112.

The third-party content server 106 may receive content items from the third-party content provider 102 or from the content item management system 104. The third-party content server 106 may store a plurality of third-party content items that are from one or more third-party content providers 102. The third-party content server 106 may provide content items to the content item management system 104, devices 108, resource servers 110, content item selection system 112, and/or to other computing devices via network 101. In some implementations, the devices 108, resource servers 110, and content item selection system 112 may request content items stored in the third-party content servers 106. The third-party content server 106 may store a content item with information identifying the third-party content provider, identifier of a set of content items, bid values, budgets, other information used by the content item selection system 112, impressions, clicks, and other performance metrics. The third-party content server 106 may further store one or more of client profile data, client device profile data, accounting data, or any other type of data used by content item management system 104 or the content item selection system 112.

The device 108 may include any number and/or type of user-operable electronic device. For instance, a device 108 may include a desktop computer, laptop, smart phone, wearable device, smart watch, tablet, personal digital assistant, set-top box for a television set, smart television, gaming console device, mobile communication device, remote workstation, client terminal, entertainment console, or any other device configured to communicate with other devices via the network 101. The device 108 may be capable of receiving a resource from a resource server 110 and/or a content item from the content item selection system 112, the third-party content server 106, and/or the resource servers 110. The device 108 may be any form of electronic device that includes a data processor and a memory. The memory may store machine instructions that, when executed by a processor, cause the processor to request a resource, load the resource, and request a content item. The memory may also store data to effect presentation of one or more resources, content items, etc. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, HTML, Java®, JavaScript®, ECMAScript®, Perl®, Python®, Visual Basic®, and XML. The device 108 may include a user interface element (e.g., an electronic display, a touch screen, a speaker, a keyboard, a pointing device, a mouse, a microphone, a printer, a gamepad, etc.) for presenting content to a user, receiving user input, or facilitating user interaction with electronic content (e.g., clicking on a content item, hovering over a content item, etc.).

The device 108 can request, retrieve, and display resources and content items. The device 108 can execute a software application (e.g., a web browser, a video game, a chat program, a mobile application, or other application) to request and retrieve resources and contents from the resource server 110 and/or other computing devices over network 101. Such an application may be configured to retrieve resources and first-party content from a resource server 110. The first-party content can include text, image, animation, video, and/or audio information. In some cases, an application running on the device 108 may itself be first-party content (e.g., a game, a media player, etc.). The first-party content can contain third-party content or require the device 108 to request a third-party content from a third-party content server 106. The device 108 may display the retrieved third-party content by itself or with the resources or the first-party content on the user interface element. In some implementations, the device 108 includes an application (e.g., a web browser, a resource renderer, etc.) for converting electronic content into a user-comprehensible format (e.g., visual, aural, graphical, etc.).

The device 108 may execute a web browser application to request, retrieve and display first-party resources and content items. The web browser application may provide a browser window on a display of the device 108. The web browser application may receive an input or a selection of a URL, such as a web address, from the user interface element or from a memory element. In response, one or more processors of the device 108 executing the instructions from the web browser application may request data from another device connected to the network 101 referred to by the URL address (e.g., a resource server 110). The computing device receiving the request may then provide web page data and/or other data to the device 108, which causes visual indicia to be displayed by the user interface element of the device 108. Accordingly, the browser window displays the retrieved first-party content, such as a web page from a website, to facilitate user interaction with the first-party content. The device 108 and/or the agent may function as a user agent for allowing a user to view HTML encoded content.

The web browser on the device 108 may also load third-party content along with the first-party content in the browser window. In some instances, the third-party content may be included within the first-party resource or content. In other instances, the first-party resource may include one or more content item slots. Each of the content item slots may contain embedded information (e.g. meta information embedded in hyperlinks, etc.) or instructions to request, retrieve, and load third-party content items. The content item slot may be a iframe slot, an in-page slot, and/or a JavaScript® slot. The web browser may process embedded information and execute embedded instructions. The web browser may present a retrieved third-party content item within a corresponding content item slot.

In some implementations, the device 108 may detect an interaction with a content item. An interaction with a content item may include displaying the content item, hovering over the content item, clicking on the content item, viewing source information for the content item, or any other type of interaction between the device 108 and a content item. Interaction with a content item does not require explicit action by a user with respect to a particular content item. In some implementations, an impression (e.g., displaying or presenting the content item) may qualify as an interaction. The criteria for defining which user inputs or device outputs (e.g., active or passive) qualify as an interaction may be determined on an individual basis (e.g., for each content item) by content item selection system 112 or by content item management system 104.

The device 108 may generate a variety of actions responsive to detecting an interaction with a content item. The generated action may include a plurality of attributes including a content identifier (e.g., a content ID or signature element), a device identifier, a referring URL identifier, a timestamp, or any other attributes describing the interaction. The device 108 may generate actions when particular actions are performed by a device (e.g., resource views, online purchases, search queries submitted, etc.). The actions generated by the device 108 may be communicated to a content item management system 104 or a separate accounting system.

The resource server 110 can include a computing device, such as a database server, configured to store resources and content items. A computing device may be a computer server (e.g., a file transfer protocol (FTP) server, a file sharing server, a web server, a database server, etc.), a group or a combination of servers (e.g., a data center, a cloud computing platform, a server farm, etc.). The resource server 110 may be any type of a computing device that includes a memory element configured to store resources, content items, and associated data. The third-party content servers 106 may include any type of non-volatile memory, media, or memory devices. For instance, the resource server 110 may include semiconductor memory devices (e.g., EPROM, EEPROM, flash memory devices, etc.) magnetic disks (e.g., internal hard disks, removable disks, etc.), magneto-optical disks, and/or CD ROM and DVD-ROM disks.

The resource server 110 may be configured to host resources. Resources may include any type of information or data structure that can be provided over network 101. Resources provided by the resource server 110 may be categorized as local resources, intranet resources, Internet resources, or other network resources. Resources may be identified by a resource address associated with the resource server 110 (e.g., a URL). Resources may include web pages (e.g., HTML web pages, PHP web pages, etc.), word processing documents, portable document format (PDF) documents, text documents, images, music, video, graphics, programming elements, interactive content, streaming video/audio sources, comment threads, search results, information feeds, or other types of electronic information. In some implementations, one resource server 110 may host a publisher web page or a search engine and another resource server 110 may host a landing page, which may be a web page indicated by a URL provided by the third-party content provider 102. Resources may include a content item slot, and when the device 108 loads the resource, the content item slot may instruct the device 108 to request a content item from a content item selection system 112.

The content item selection system 112 can include at least one logic device, such as a computing device having a data processor, to communicate via the network 101, for instance with a third-party content provider 102, the content item management system 104, the third-party content server 106, the device 108, and the resource server 110. In some implementations, the content item selection system 112 may be combined with or include the third-party content servers 106, the content item management system 112, or the resource server 110.

The content item selection system 112, in executing an online auction, can receive, via the network 101, a request for a content item. The received request may be sent from a resource server 110, a device 108, or any other computing device in the system 100. The received request may include instructions for the content item selection system 112 to provide a content item with the resource. The received request can include device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords associated with the requested resource, text of the content of the resource, a title of the resource, a category of the resource, a type of the resource, etc.). The information that the content item selection system 112 receives can include a HyperText Transfer Protocol (HTTP) cookie which contains a device identifier (e.g., a random number) that represents the device 108. In some implementations, the device information and/or the resource information may be appended to a content item request URL (e.g., contentitem.item/page/contentitem?devid=abc123&devnfo=A34r0). In some implementations, the device information and/or the resource information may be encoded prior to being appended the content item request URL. The requesting device information and/or the resource information may be utilized by the content item selection system 112 to select third-party content items to be served with the requested resource and presented on a display of a device 108. The selected content item may be marked as eligible to participate in an online auction.

In some implementations, the received request may be part of a web page or other resource (such as, for instance, an application) that includes one or more content item slots in which a selected and served third-party content item may be displayed. The code within the web page or other resource may be in JavaScript®, ECMAScript®, HTML, etc, and define a content item slot. The code may include instructions to request a third-party content item from the content item selection system 112 to be presented with the web page. In some implementations, the code may include an image request having a content item request URL that may include one or more parameters (e.g., /page/contentitem?devid=abc123&devnfo=A34r0). Such parameters may, in some implementations, be encoded strings such as "devid=abc123" and/or "devnfo=A34r0."

Content item selection system 112, in response to receiving the request, may select and serve third-party content items for presentation with requested resources via the Internet or other network. The content item selection system 112 may be controlled or otherwise influenced by a third-party content provider 102 that utilizes a content item management system 104. For instance, a third-party content provider 102 may specify selection criteria (such as keywords) and corresponding bid values that are used in the selection of the third-party content items. The bid values may be utilized by the content item selection system 112 in an auction to select and serve content items for presentation with a resource. For instance, a third-party content provider may place a bid in the auction that corresponds to an agreement to pay a certain amount of money if a user interacts with the provider's content item (e.g., the provider agrees to pay $3 if a user clicks on the provider's content item). In other instances, a third-party content provider 102 may place a bid in the auction that corresponds to an agreement to pay a certain amount of money if the content item is selected and served (e.g., the provider agrees to pay $0.005 each time a content item is selected and served or the provider agrees to pay $0.05 each time a content item is selected or clicked). In some instances, the content item selection system 112 uses content item interaction data to determine the performance of the third-party content provider's content items. For instance, users may be more inclined to click on third-party content items on certain webpages over others. Accordingly, auction bids to place the third-party content items may be higher for high-performing webpages, categories of webpages, and/or other criteria, while the bids may be lower for low-performing webpages, categories of webpages, and/or other criteria.

In some implementations, content item selection system 112 may determine one or more performance metrics for the third-party content items and the content item management system 104 may provide indications of such performance metrics to the third-party content provider 102 via a user interface. For instance, the performance metrics may include a cost per impression (CPI) or cost per thousand impressions (CPM), where an impression may be counted, for instance, whenever a content item is selected to be served for presentation with a resource. In some instances, the performance metric may include a click-through rate (CTR), defined as the number of clicks on the content item divided by the number of impressions. In some instances, the performance metrics may include a cost per engagement (CPE), where an engagement may be counted when a user interacts with the content item in a specified way. An engagement can be sharing a link to the content item on a social networking site, submitting an email address, taking a survey, or watching a video to completion. Still other performance metrics, such as cost per action (CPA) (where an action may be clicking on the content item or a link therein, a purchase of a product, a referral of the content item, etc.), conversion rate (CVR), cost per click-through (CPC) (counted when a content item is clicked), cost per sale (CPS), cost per lead (CPL), effective CPM (eCPM), and/or other performance metrics may be used. The various performance metrics may be measured before, during, or after content item selection, content item presentation, user click, or user engagement.

The content item selection system 112 may select a third-party content item to serve with the resource based on performance metrics and/or several influencing factors, such as a predicted click through rate (pCTR), a predicted conversion rate (pCVR), a bid associated with the content item, etc. Such influencing factors may be used to generate a value, such as a score, against which other scores for other content items may be compared by the content item selection system 112 through an auction.

During the auction for a content item slot for a resource, content item selection system 112 may utilize several different types of bid values specified by third-party content providers 102 for various third-party content items. For instance, an auction may include bids based on whether a user clicks on the third-party content item, whether a user performs a specific action based on the presentation of the third-party content item, whether the third-party content item is selected and served, and/or other types of bids. For instance, a bid based on whether the third-party content item is selected and served may be a lower bid (e.g., $0.005) while a bid based on whether a user performs a specific action may be a higher bid (e.g., $5). In some instances, the bid may be adjusted to account for a probability associated with the type of bid and/or adjusted for other reasons. For instance, the probability of the user performing the specific action may be low, such as 0.2%, while the probability of the selected and served third-party content item may be 100% (e.g., the selected and served content item will occur if it is selected during the auction, so the bid is unadjusted). Accordingly, a value, such as a score or an normalized value, may be generated to be used in the auction based on the bid value and the probability or another modifying value. In the prior instance, the value or score for a bid based on whether the third-party content item is selected and served may be $0.005*1.00=0.005 and the value or score for a bid based on whether a user performs a specific action may be $5*0.002=0.01. To maximize the income generated, the content item selection system 112 may select the third-party content item with the highest value from the auction. In the foregoing instance, the content item selection system 112 may select the content item associated with the bid based on whether the user performs the specific action due to the higher value or score associated with that bid.

Once the content item selection system 112 selects a third-party content item, data to effect presentation of the third-party content item on a display of the device 108 may be provided to the device 108 using a network 101. The user on the device 108 may select or click on the provided third-party content item. In some instances, a URL associated with the third-party content item may reference another resource, such as a web page or a landing page. In other instances, the URL may reference back to the content item selection system 112, a third-party content server 106, or an content item management system 104. The device 108 may send a request using the URL, and one or more performance metrics are updated, such as a click-thru or engagement. The device 108 is redirected to a resource, such as a web page or a landing page, that has been provided by a third-party content provider 102 along with the content item.

In some implementations, the content item selection system 112 can include a click server. The click server may measure, store, or update performance metrics. The click server may be part of the content item management system 104, or another server connected to the network 101. The click server receives a request from a device 108 when the user interacts with the content item that the device 108 receives from the content item selection system 112. For instance, a user on the device 108 may interact with a content item by clicking the content item, and the user may be redirected to a click page stored on the click server. The click server may record an interaction with the content item. In another instance, a content item may redirect the user to the click page on the click server automatically without user interaction. In such instances, an interaction may be recorded when the user on the device 108 did not actually interact with the content item. After recording the interaction, the click server may update a performance metric stored in the content item management system 104 or the third-party content server 106, where the performance metric is associated with a content item that was loaded on the device 108. For instance, the metric may be a user engagement with an advertisement. The performance metric may be stored in association with the provided third-party content item in the third-party content server 106. The click server may redirect the device 108 to a resource that is stored in a resource server 110, wherein the resource may be the landing page that is identified by the URL provided by the third-party content provider 102 and associated with the content item.

In an illustrative instance, a device 108 using a web browser can browse to a web page provided by a web page publisher. The web page publisher may be the first-party content provider and the web page may be the first-party content. The web page can be provided by a resource server 110. The device 108 loads the web page which contains a third-party content item, such as an ad. In some implementations, the resource server 110 may receive an ad from an ad server and provide the ad with the web page to a device 108. The ad server may be a third-party content server 106. In some implementations, the web page publisher may provide search engine results and the ads may be provided with the search results. In some implementations, the web page may contain a link that either directly or indirectly references an ad server. For instance, as a web browser on a device loads the web page, the device requests the ad and receives it from the ad server. The ad server receives the ad from an advertiser. The advertiser may be a third-party content provider 106. The advertiser may create or provide information to generate the ad. The ad may link to a landing page which can be another web page or resource. The link can be provided by the advertiser. The ad can also contain advertiser's contact information. In some implementations, the ad may link to a click server that updates performance metrics associated with the ad and redirects the client device 108 to the landing page.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content item from the content server that may be more relevant to the user. In addition, certain data may be treated (e.g., by content item selection system 112) in one or more ways before it is stored or used, so that personally identifiable information is removed. For instance, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected (e.g., by an application, by devices 108, etc.) and used by content item selection system 112.

Figure 2A:
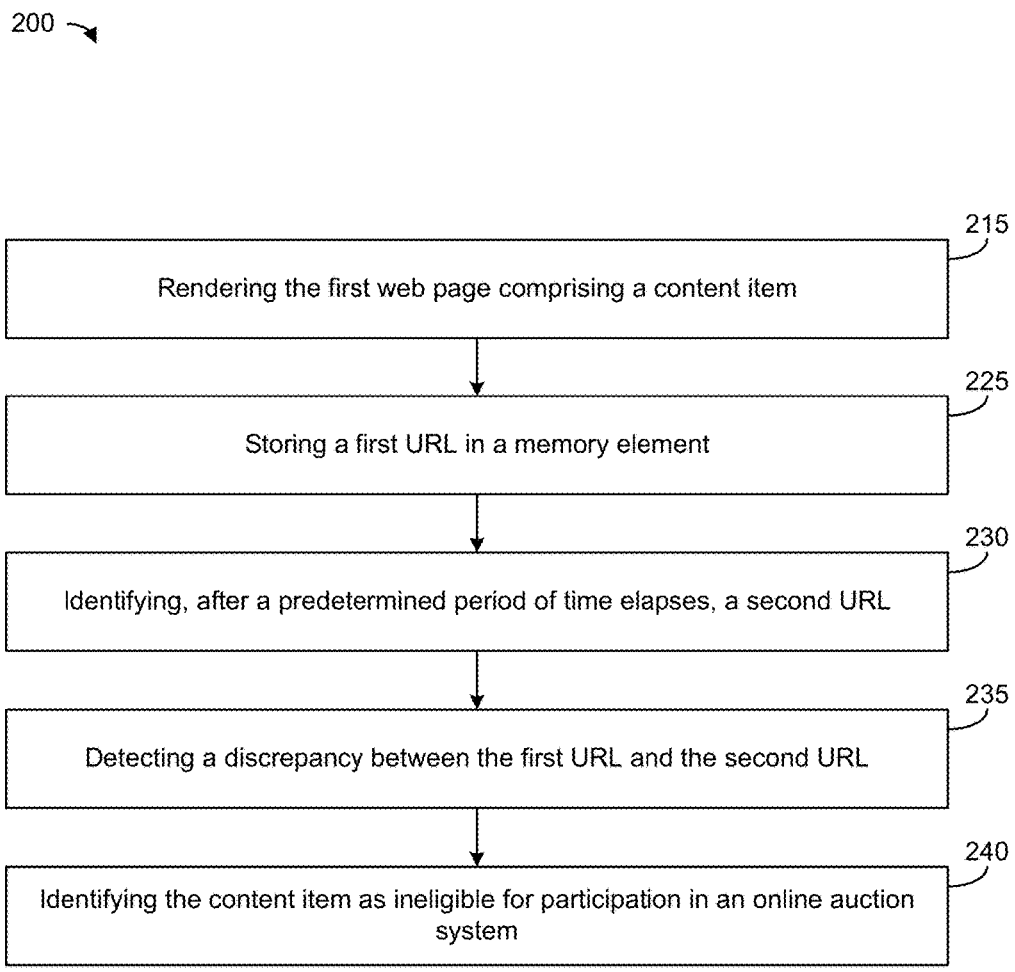
FIG. 2A depicts one implementation of a process for checking for redirection of a content item.

FIG. 2A depicts one implementation of a process for checking for redirection of a device by a served content item. In brief overview, the method generally includes rendering a first web page comprising a content item (step 215), storing a first URL in a memory element (step 225), and identifying, after a predetermined period of time elapses, a second URL (step 230). The method may also include detecting a discrepancy between the first URL and the second URL (step 235), and identifying the content item as ineligible for participation in an online auction system (step 240).

Still referring to FIG. 2A, and in more detail, the method includes rendering a first web page comprising a content item in a browser (step 215). The first web page may be identified by a first URL and may comprise a content item. In some implementations, rendering a first web page may include dynamically generating a first web page that includes the content item. In some implementations, the first web page may be generated for a given content item. For instance, an input of content item may produce an output of the first web page that is unique to that input. In some implementations, the first web page may be generated to only include the content item, or only the content item without any other content items. In some implementations, the first web page may include a content item slot, or instructions that embed the content item, that reference the content item. In some implementations, the first web page is generated from a template web page that is known to not contain any redirections. In some implementations, the first web page is modified from an existing web page that is known to not contain any redirections. For instance, the web page generator 307 may modify a web page that was used to check a first content item in order to check a second content item. A first URL may be identified for the generated first web page.

Rendering a first web page may further include the browser loading, parsing, and displaying the first web page. A resource identifier that identifies the first web page may be used to load the first web page. Parsing the first web page may include parsing the HTML of the first web page. The first web page may be parsed into an object tree, such as a document object model (DOM) tree. The DOM tree is a hierarchical model of a particular resource. The content item referenced by the first web page may be loaded. In some implementations where the content item includes a display content and code, both the display content and code may be loaded. In some implementations, the first web page may be further parsed, such as parsing a Cascading Style Sheets (CSS) to attach rendering information to matching nodes of the DOM tree. In some implementations, the first web page contains additional instructions, such as content item slots, that may be parsed and executed. In some implementations, the execution of instructions in the content item slots retrieves the content item. Rendering the web page may include displaying the content item, which may include displaying the display content of the content item. The code of the content item may be executed. The code may include a second URL that when executed with the rest of the code will redirect the browser to a second web page identified by the second URL that is different from the first URL. In some instances of content items that do not automatically redirect the browser, the code may include a second URL that when executed with the rest of the code will only redirect the browser after receiving a click on the display content of the content item.

As shown in FIG. 2A, the method further includes storing the first URL in a memory element (step 225). In some implementations, storing the first URL includes retrieving the first URL from the browser that renders the first web page. In implementations that generate the first web page, the first URL may be identified when generating the first web page. In implementations that modify an existing web page, the first URL may be identified when modifying the existing web page. In some implementations, the first URL may be stored in a memory element local to the process executing the method. In some implementations, the first URL may be stored in a local variable, a temporary variable, or a cache. In some implementations, the first URL is stored as a text string. In some implementations, a screenshot of a navigation bar of the browser may be captured. In some implementations, a window of the browser is resized such that it covers an entire screen before the screenshot is captured. A screenshot of the entire screen may be captured and cropped to include only the image of the navigation bar. The screenshot of the navigation bar may be stored in the memory element as the first URL or in association with the first URL.

As shown in FIG. 2A, the method further includes identifying a second URL, after a predetermined period of time elapses (step 230). In some implementations, a timer is set for the duration of the predetermined period of time after rendering the first web page or storing the first URL. For instance, the predetermined period of time may be between zero seconds to two minutes. In some implementations, the second URL is identified at the expiry of the timer. In some implementations, the timer may be a interrupt service.

In some implementations, the predetermined period of time may be a static or a dynamic value. The predetermined period of time may a static value between zero seconds to several minutes. The static value may be determined empirically or set to a hard-coded value. In some implementations, the predetermined period of time may be a dynamic value, which may be different for different content items. Determining the predetermined period of time is discussed in greater detail in relation to block 205 of FIG. 2B.

The predetermined period of time may be measured from different points in time. In some implementations, the predetermined period of time may be measured from when the first web page is rendered. In some implementations, the predetermined period of time may be measured from when a latest URL request is sent or when a latest URL response is received. For instance, when a URL request is sent by the first web page, any instance or process of a timer is killed or deleted and a new timer is created that is set to expire on the expiry of the predetermined period of time. Alternatively, the timer may be reset with the predetermined period of time. For instance, the first web page may make a URL request five seconds after rendering the first web page (step 215), and upon detecting that request, the timer may be reset with the predetermined period of time. The first web page may make a URL request after the first web is rendered if, for instance, the content item includes code that makes a URL request. The URL request may be delayed from the rendering of the first web page (step 215) due to one or more factors including code execution time, retrieving multiple resources via multiple URL load requests, network latency, and server load. In some implementations, the code may periodically refresh the display content and make a periodic URL request.

In some implementations, a maximum timer reset value may cap the number of times the timer may be reset. The maximum timer reset value may be between zero to ten. The timer may be killed, deleted, or reset a maximum number of times that equals the maximum timer reset value, and any subsequent URL request may not kill, delete, or reset the timer. In some implementations, a maximum timer delay time may cap the maximum delay time. The maximum timer delay time may be between one to sixty seconds. Any URL request made after the maximum timer delay time may not kill, delete, or reset the timer. In some implementations, both the maximum timer reset value and the maximum timer delay time may be used to limit the timer reset.

The second URL is associated with the content item rendered by the browser. The second URL may be part of the content item and/or the code of the content item that was rendered. The second URL may be different from the URL that is part of the content item and/or the code of the content item. For instance, the content item may have automatically redirected the browser to a URL that was included in the content item, and the web page identified by that URL may itself redirect the browser to a second web page identified by the second URL. In some implementations, the second URL may be identified by instructions included within the first web page when the content item redirects away from the first web page, before the expiry of a predetermined period of time.

In some implementations, the second URL may be identified from a navigation bar of the browser. The navigation bar includes a text field that displays a URL of a web page or a resource that is currently displayed on the browser or a resource that the browser is currently loading. The second URL may be identified by calling a function of the browser or the navigation bar that returns the URL of the text field. In some implementations, the second URL is identified as a text string. In some implementations, an image of a screenshot of the browser may be captured after resizing the window of the browser to cover the entire screen. In some implementations, the screenshot may be of the navigation bar and/or cropped from the screenshot of the entire browser. In some implementations, the image may be stored as the second URL. In some implementations, text recognition may be used on the image to identify the second URL from the image.

In some implementations, the second URL may be identified using one of a browser extension, plug-in, a function call, or a property. The browser extension, plug-in, or function may identify the second URL. The property may store the URL of the resource that is currently loaded. The method may include calling a function on the navigation bar or the browser which may store the URL of the resource that is currently displayed.

As shown in FIG. 2A, the method further includes detecting a discrepancy between the first URL and the second URL (step 235). In some implementations, detecting a discrepancy may include retrieving the first URL that is stored in the memory element. The first URL may be compared with the second URL. In implementations where the first and second URLs are stored as text strings, comparing the first and second URLs includes text string comparison. In implementations where the first and second URLs are stored as screenshots, comparing the first and second URLs includes image comparison. In some implementations, the comparison detects a discrepancy as soon as a single difference between the first and second URLs is identified. In some instances, the first URL may be the same as the second URL, and the content item may be updated as eligible for participation in an online auction.

As shown in FIG. 2A, the method further includes identifying, responsive to the discrepancy detection, the content item as ineligible for participation in an online auction system (step 240). In some implementations, the content item or associated information may be updated to indicate that the content item will not participate in an online auction system and that the content item violates a policy by automatically redirecting the browser. In some implementations, the third-party content provider may be alerted that the content item violates the policy and that the content item will not participate in online auction. The alert may be sent via an email, an account notification, a text, a phone call, or any other contact information associated with an account of the third-party content provider. In some implementations, a content item may be marked with a severity value of a policy.

Figure 2B:
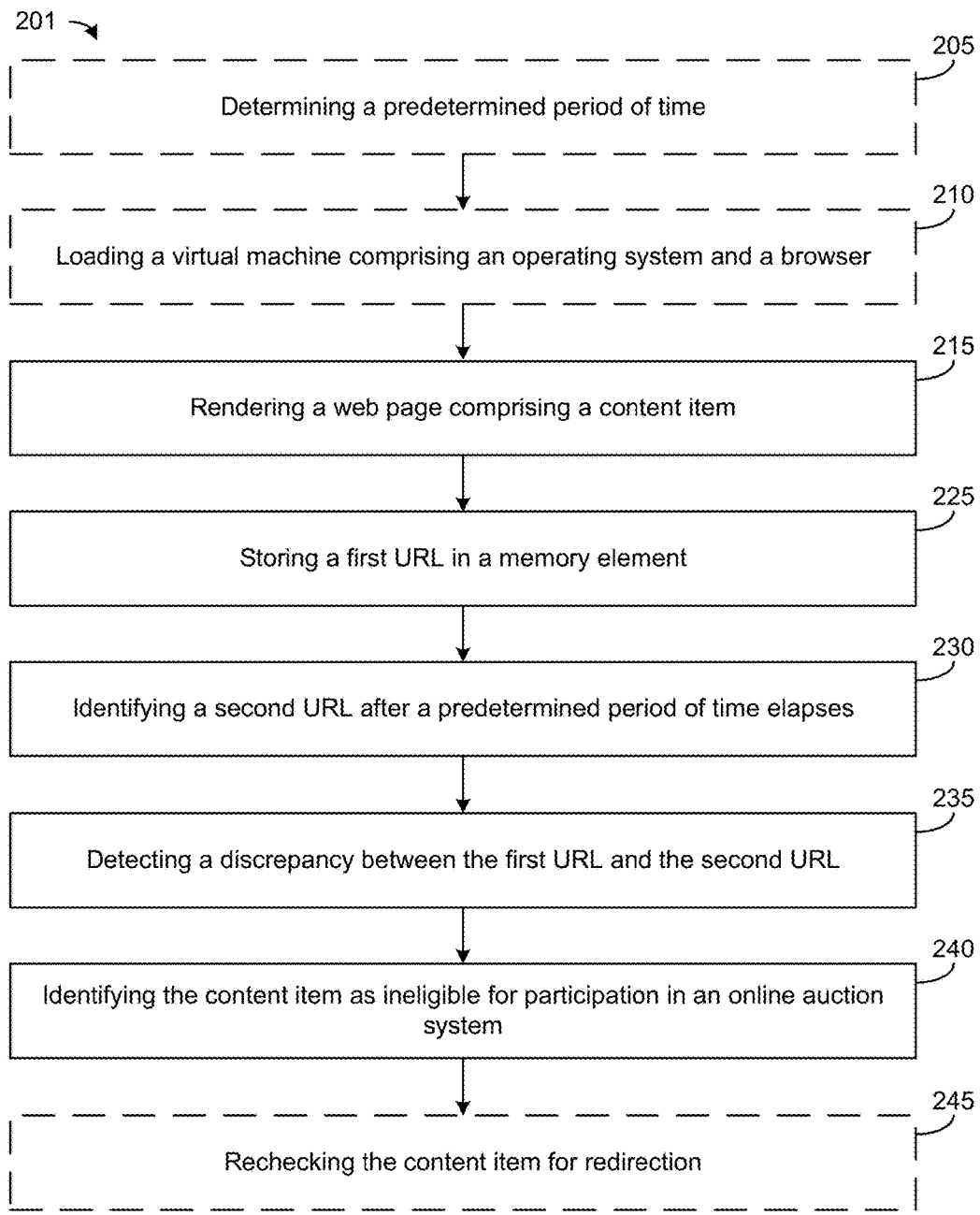
FIG. 2B depicts another implementation of a process for checking for redirection of a content item.

FIG. 2B depicts another implementation of a process for checking for redirection of a content item. In brief overview, the method optionally includes determining a predetermined period of time (step 205) and loading a virtual machine comprising an operating system and a browser (step 210), shown in phantom view. The method includes rendering a first web page comprising a content item (step 215), storing a first URL in a memory element (step 225), and identifying, after a predetermined period of time elapses, a second URL (step 230). The method may also include detecting a discrepancy between the first URL and the second URL (step 235), and identifying the content item as ineligible for participation in an online auction system (step 240). The method may also optionally include rechecking the content item for redirection (step 245), shown in phantom view.

Still referring to FIG. 2B, and in more detail, the method optionally includes determining a predetermined period of time (step 205). The predetermined period of time is used in identifying, after the predetermined period of time elapses, a second URL (step 230). In some implementations, the predetermined period of time may be a static value. In some implementations, the predetermined period of time may be determined from a plurality redirecting content items. In some implementations, the predetermined period of time may be determined once and used for a plurality of content items that are checked for automatic redirection. In other implementations, the predetermined period of time may be updated periodically, such as every few hours or every few days.

In implementations where the predetermined period of time is determined from a plurality of redirecting content items, each one of the plurality of redirecting content items may be associated with a redirect time, which is a time at or by which the corresponding redirecting content item redirects the browser. In some implementations, the predetermined period of time may be set to the maximum of a plurality of redirect times that includes each of the corresponding redirect times. In other implementations, the predetermined period of time may be calculated to a value that is greater than a set percentage of the plurality of redirect times. For instance, the predetermined period of time may be set to thirty seconds, which is greater than 99% of the plurality of redirect times. In other implementations, the redirect times may be used to calculate a probability distribution function, such as a Weibull, Rayleigh, or Exponential distribution functions. The probability distribution function can be used to set the predetermined period of time that is greater than a set percentile. For instance, the predetermined period of time may be set to two minutes, which is greater than 99% of plurality of redirect times.

In some implementations, the predetermined period of time may be dynamic. In some implementations, the predetermined period of time may be a dynamic value, which may be different value for different content items. The predetermined period of time may be set to a random value between a range of values, such as between thirty seconds to two minutes. In some implementations, the predetermined period of time may be determined from one or more factors, including a topic of the content item, a format of the content item, a legitimacy rating of the content item provider, and/or other characteristics of the content item or the content item provider. In some implementations, the one or more factors may modify a base predetermined period of time. Each factor may increase, decrease, or set the predetermined period of time. For instance, the content item may be associated with a topic, and for some topics, the predetermined period of time may be longer than other topics. If the topic of a content item is "health and fitness," the predetermined period of time may be set to or modified by one minute, while if the topic is "online shopping," the predetermined period of time may be set to or modified by two minutes. In another instance, the content item may specify a format of video, and for video contents, the predetermined period of time may be set to or modified by one minute. For an image content item, such as a banner, the predetermined period of time may be set to or modified by two minutes. In yet another instance, the content item provider may be associated with a legitimacy rating, which may be calculated based on how long the content item provider utilized the content item management system, past performance metrics of content items provided by the content item provider, severity of past policy violations, types of past policy violations, and/or percentage of past policy violations. The predetermined period of time may be set or modified based on the legitimacy rating. For instance, a high legitimacy rating may decrease the predetermined period of time by one minute, while a lower legitimacy rating may increase the predetermined period of time by one minute.

As shown in FIG. 2B, the method optionally includes loading a virtual machine comprising an operating system and a browser (step 210). The operating system may also be referred to as a guest system. Loading the virtual machine may include loading any software that allows the operating system interfaces with a host system that interfaces with underlying hardware, including a network adapter. Loading the operating system may include loading necessary software to communicate with the underlying host system to use the network adapter to send and receive requests from a network. Loading the operating system may also include connecting to a network so that applications executing on top of the operating system may access files or databases on the network. Loading the browser may include loading programs, extensions, plug-ins and other programs that load, parse, display, and execute resources, web pages, or content items. For instance, loading the browser may include loading a layout engine, a script parser, or a multimedia player.

The method may further include rendering a web page comprising a content item (step 215), which is described in relation to FIG. 2A. In some implementations, rendering the web page in a browser on a virtual environment allows control over different settings. For instance, the web page may be rendered on specific versions of an operating system on a specific version and type of a browser and user agent string. The web page may further be rendered with different versions of applications that run different versions of compilers, interpreters, and multimedia applications.

The method may further include storing the first URL in a memory element (step 225), which is described in relation to FIG. 2A. In some implementations, storing the first URL in a memory element may also include storing the first URL is a memory location accessible to the operating system and/or the virtual machine.

The method may further include identifying a second URL after a predetermined period of time elapses (step 230), which is described in relation to FIG. 2A. The predetermined period of time may have been determined statically or dynamically (step 205). In some implementations, the predetermined period of time may be requested from the host system. In some implementations, the predetermined period of time may be read from a location in memory. In some implementations, the predetermined period of time may be reset after a URL load request by the first web page.

The method may further include detecting a discrepancy between the first URL and the second URL (step 235), which is described in relation to FIG. 2A. The first URL may be retrieved from the memory location accessible by the operating system.

The method may further include and identifying the content item as ineligible for participation in an online auction system (step 240), which is described in relation to FIG. 2A. In some implementations, the content item is updated to indicate that the content item is ineligible to participate in online auction. In some implementations, an update may be sent to the host system or to another device on the network.

The method may optionally include rechecking the content item for redirection (step 245). In some instances where the content item is marked as ineligible for participation in online auction, the third-party content provider may change the content item. The third-party content provider, after receiving the alert of the policy violation, may change the content item to not automatically redirect the browser. In other instances, the content item may have been marked as eligible for participation in online auction and the third-party content provider may change the content item for other reasons such as to update the display content or code of the content item. In response to detecting that the content item has been changed, the content item may be rechecked for redirection. In some instances, a listener, a callback, or an observer may be attached to a function that changes the content item or the code of the content item, such that the content item is rechecked for redirection.

For content items that are marked as eligible for participation in online auction, the content item may be rechecked for redirection periodically. In some implementations, the period of time between the checks may be predetermined. For instance, the period of time may be a day or several days. In other implementations, the period of time between the checks may be based on a performance metric, such as impressions. For instance, a content item may be rechecked for automatic redirection for every thousandth impression. In some implementations, a content item may be rechecked for automatic redirection based on a predetermine value or a performance metric. For instance, the content item may be rechecked for automatic redirection every thousandth impression or if the content item has not been rechecked for a predetermined period of time.

The method may optionally include utilizing static code analysis of the content item, which is not shown in FIG. 2B. The code of the content item may be analyzed to determine if any of the instructions will automatically redirect the browser. In some implementations, if the static code analysis shows that the content does not automatically redirect, the method 201 shown in FIG. 2B is performed. In some implementations, the code that detects redirection may be included in the first web page. In some implementations, the code may be included as part of a browser extension or plug-in. In some implementations, if the content does not automatically redirect, static code analysis is performed. Static code analysis may include parsing the code included in the content item to find specific instructions, such as HTML tag of <meta http-equiv="refresh">, JavaScript instructions js window.location assignment, or window.open.js with a replace parameter.

Figure 2C:
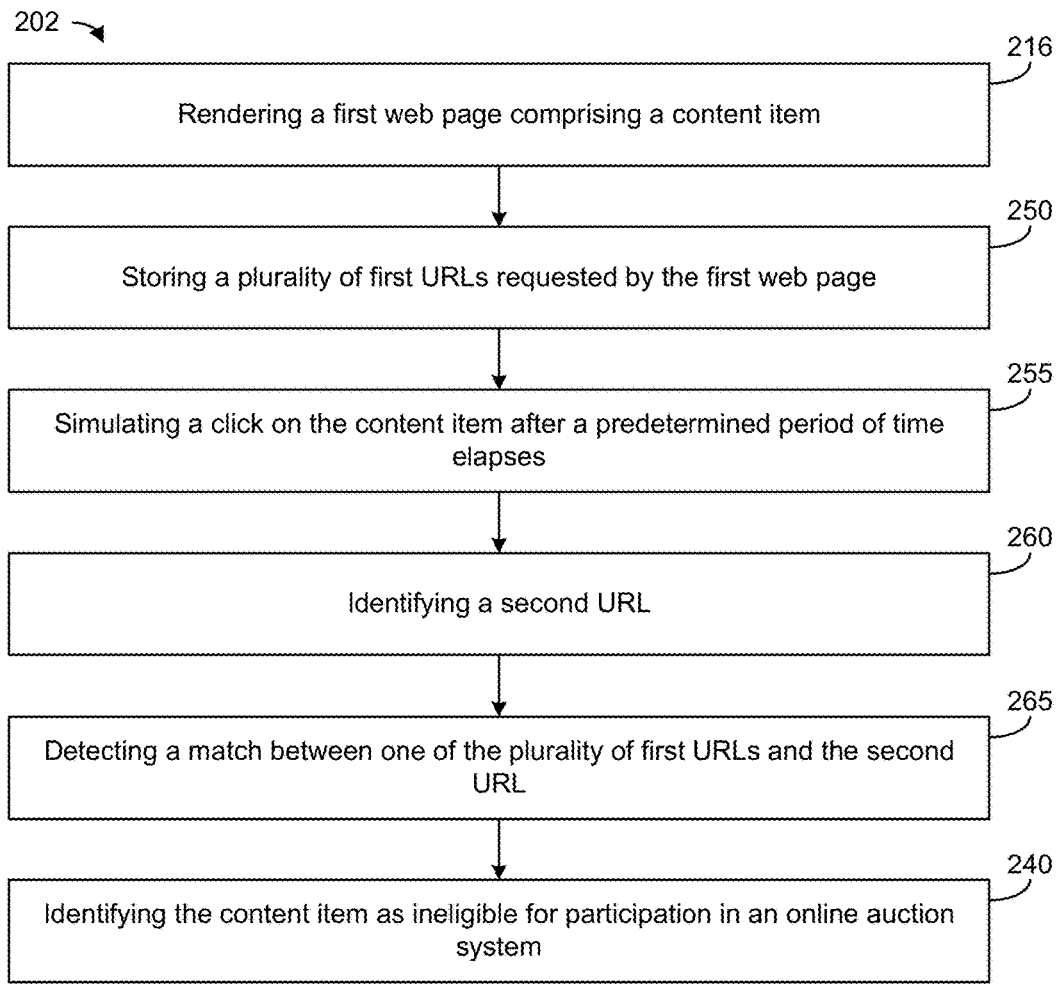
FIG. 2C depicts yet another implementation of a process for checking for redirection of a content item.

FIG. 2C depicts yet another implementation of a process for checking for redirection of a content item. In brief overview, the method includes rendering a first web page comprising a content item (step 216), storing a plurality of first URLs requested by the first web page (step 250), and simulating a click on the content item after a predetermined period of time elapses (step 255). The method further includes identifying a second URL (step 260), detecting a match between one of the plurality of first URLs and the second URL (step 265), and identifying the content item as ineligible for participation in an online auction system (step 240).

Still referring to FIG. 2C, and in more detail, the method includes rendering a first web page comprising a content item (step 216). In some implementations, rendering a first page is similar to rendering the web page (step 215) as described in relation to FIGS. 2A and 2B. In some implementations, the first web page may be dynamically generated for the content item. In some implementations, a virtual machine may generate and render the first web page.

Still referring to FIG. 2C, and in more detail, the method includes storing a plurality of first URLs requested by the first web page (step 250). In some implementations, the plurality of first URLs may be HTTP requests or fetches. The first URLs requested by the first web page may be detected via a script, an extension or a plugin. In some implementations, the first URLs may be detected by monitoring a port or a plurality of ports of a protocol, such as the TCP. The first URLs may be detected via capturing packet data from a network interface. The packet data may be captured by a service or a monitor that is placed in between a local port and a server port. In some implementations, the first URLs may be detected via tracking IP connections. The first URLs may be captured from in-bound and/or out-bound traffic data. The detected plurality of first URLs may be stored in a memory element. In some implementations, the plurality of first URLs may be stored in a temporary cache. In other implementations, the first URLs may be determined from a response to a request. For instance, a response header may contain a location from which the response is sent.

Still referring to FIG. 2C, and in more detail, the method includes simulating a click on the content item after a predetermined period of time elapses (step 255). In some implementations, a movement of a mouse cursor may be simulated such that the mouse cursor is placed over the content item. In some implementations, a mouse click event is triggered with parameters indicating a screen or mouse coordinates that is within the bounds of the content item. In some implementations, the mouse click event may be a mouse down event or a mouse up event. In some implementations, the coordinates may be determined via an analysis of the content item or the code included in the content item. For instance, some content items may include a button within a display content that must be clicked in order to redirect to a second web page. In some implementations, if after a click event is triggered an no further HTTP request is detected, another mouse event may be triggered with different coordinates. In some implementations, simulating a click may include parameters specifying that a new window or a new tab should open the second web page.

The predetermined period of time may be a static or dynamic value. Optionally, the predetermined period may be determined (step 205), as described in relation to FIG. 2B. In some implementations, the predetermined period of time may be determined for each content item. In some implementations, the predetermined period of time may be determined once or periodically, and used in checking a plurality of content items. The predetermined period of time may be measured from different points in time, as described in relation to FIG. 2A (step 230). In some implementations, a maximum timer reset value and/or a maximum timer delay time may limit the timer reset.

Still referring to FIG. 2C, and in more detail, the method includes identifying a second URL (step 260). In some implementations, identifying a second URL may be similar to identifying, after a predetermined period of time elapse, a second URL (step 230) as described in relation to FIGS. 2A and 2B. In this method 202, the second URL may be identified after a click on the content item is simulated. The second URL may be identified using one of a browser extension, plug-in, a function call, or a property. The second URL may be identified from a navigation bar of a browser.

Still referring to FIG. 2C, and in more detail, the method includes detecting a match between one of the plurality of first URLs and the second URL (step 265). In some implementations, a match is only detected if there is an exact match between one of the plurality of first URLs and the second URL. In some implementations, before detecting a match, the second URL and the plurality of first URLs may be converted to a corresponding modified URL. For instance, the modified URL may be a canonical URL. A canonical URL may be the authoritative URL for a resource. The canonical URLs may be specified within a code that is included in the content item or the second web page. In other implementations, a corresponding modified URL may be derived from second URL and from each of the plurality of first URLs. For instance, extraneous characters at the end of a URL may be removed to modify the URL. The modified URL of the second URL may then be compared to each of the plurality of modified URLs corresponding to the first URLs.

Still referring to FIG. 2C, and in more detail, the method includes identifying the content item as ineligible for participation in an online auction system (step 240), which is described in relation to FIGS. 2A and 2B. In some implementations, the content item may be marked with a severity value of the violation of a policy. In some implementations, detecting a redirect via different methods 200, 201, and 202 may determine the severity value of the violation.

Figure 3A:
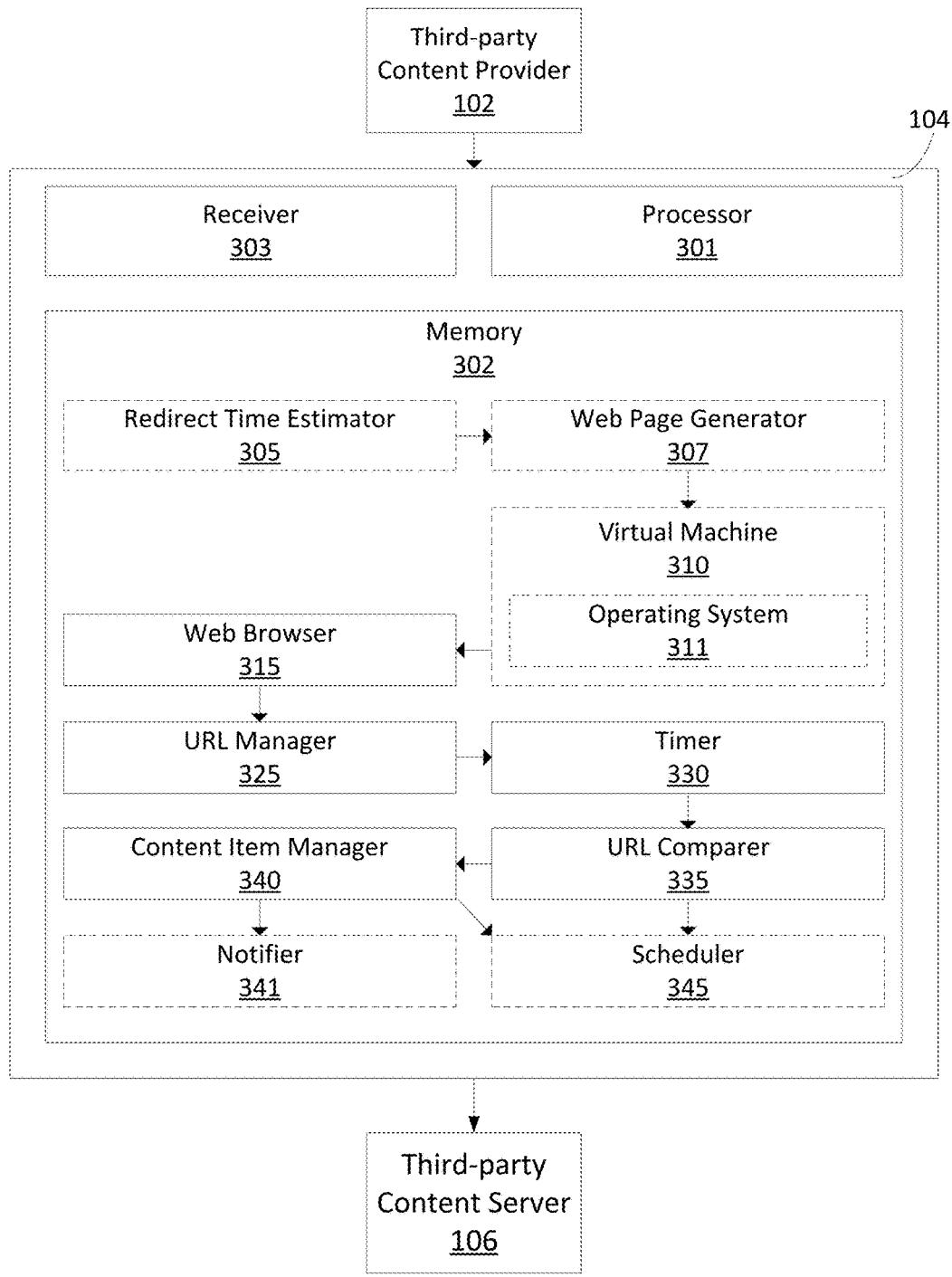
FIG. 3A is a block diagram illustrating one implementation of the content item management system of FIG. 1 in greater detail.

FIG. 3A is a block diagram illustrating one implementation of the content item management system 104 of FIG. 1 in greater detail, shown to include a processor 301, memory 302, and receiver 303. The receiver 310 may be a communication interface that includes wired or wireless interfaces (e.g., jacks, antennas, transmitters, receivers, transceivers, wire terminals, Ethernet ports, WiFi transceivers, etc.) for conducting data communications with local or remote devices or systems via the network 101. For instance, the receiver 310 may allow content item management system 104 to communicate with third-party content provider 102, third-party content server 106, resource server 110, and other components of computer system 100. In some implementations, the receiver may have a corresponding module or software that works in conjunction with hardware components. The receiver 310 may receive a content item from a third-party content provider 102. The receiver 310 may transmit the received content item to the virtual machine 310, operating system 311, the web browser 315, and/or a module in memory.

The processor 301 may be implemented as a general purpose processor, an application specific integrated circuit (ASIC), one or more field programmable gate arrays (FPGAs), a CPU, a GPU, a group of processing components, or other suitable electronic processing components. The processor 301 may be connected directly or indirectly to the memory 302 and the receiver 310. The processor 301 may read, write, delete, or otherwise access data stored in memory 302 or other components. The processor 301 may execute instructions stored in memory 302.

Memory 302 may include one or more devices (e.g., RAM, ROM, flash memory, hard disk storage, etc.) for storing data and/or computer code for completing and/or facilitating the various processes, layers, and modules described in the present disclosure. Memory 302 may include volatile memory or non-volatile memory. Memory 302 may include database components, object code components, script components, or any other type of information structure for supporting the various activities and information structures described in the present disclosure. In some implementations, memory 302 is communicably connected to processor 301 and includes computer code (e.g., data modules stored in memory 302) for executing one or more processes described herein. In brief overview, memory 302 is shown to include an optional redirect time estimator 305, an optional web page generator 307, an optional virtual machine 310 including an optional operating system 311, a web browser 315, URL manger 325, timer 330, URL comparer 335, content item manager 340, an optional notifier 341, and an optional scheduler 345.

Still referring to FIG. 3A, memory 302 is shown to include an optional redirect time estimator 305. In some implementations, the redirect time estimator 305 may execute on another computer device connected to the network. The redirect time estimator 305 may determine the predetermined period of time that is used by the timer 330. In some implementations, the redirect time estimator 305 may check whether the predetermined period of time has been determined and determine the predetermined period of time if it has not yet been determined. The redirect time estimator 305 may determine a static value or a dynamic value to be used as a predetermined period of time.

In some implementations, the redirect time estimator 305 may determine a static value. In some implementations, the redirect time estimator 305 may execute periodically to update the predetermined period of time. The redirect time estimator 305 may have access to a plurality of redirecting content items, each one of the redirecting content items associated with a redirect time indicating a time at or by which the respective content item redirects. In some implementations, the redirect time estimator 305 may determine that one or more of the plurality of content items are redirecting and include the redirecting content items in the plurality of redirecting content items. In other implementations, the redirect time estimator 305 may receive the plurality of redirecting content items. The redirect time estimator 305 may take the maximum redirect time of a plurality of redirect times, each corresponding to one of the plurality of redirecting content items, and use the maximum redirect time as the predetermined period of time. In some implementations, the redirect time estimator 305 may calculate a predetermined period of time that is greater than a set percentage of redirect times. For instance, a predetermined period of time may be set to two minutes that is greater than 99% of redirect times. In other implementations, the redirect time estimator 305 may calculate the predetermined period of time based on a probability distribution function that is calculated from the redirect times corresponding to the plurality of redirect content items.

In some implementations, the redirect time estimator 305 may execute for each content item and provide a dynamic value for the predetermined period of time. The redirect time estimator 305 may set the predetermined period of time to a random value within a range of values. The redirect time estimator 305 may set the predetermined period of time from one or more factors, including one or more characteristics of the content item or the content item provider.

Still referring to FIG. 3A, memory 302 is shown to optionally include a web page generator 307. The web page generator 307 may receive the content item from the third-party content provider 102 or the third-party content server 106. The web page generator 307 may dynamically generate a web page, which may be a HTML document that is unique to the content item. In some implementations, the web page generator 307 may take an input of an URL that identifies a content item and outputs a HTML document that references the content item. In other implementations, the web page generator 307 may take an input of a template and outputs the HTML document. In other implementations, the web page generator 307 may take an input of a HTML document and modify it. The template and/or the input HTML document may be known to not contain any automatic redirection. The web page output may include the content item, and, in some implementations, instructions to detect when the referenced content item redirects.

Still referring to FIG. 3A, memory 302 is shown to optionally include a virtual machine 310 that includes an operating system 311. The virtual machine 310 may be loaded or executed on a host system that interfaces with the underlying hardware including a network adapter. The virtual machine may include an operating system 311, also referred to as a guest system, that interfaces with the host system. The operating system 311 may be configured to communicate via the network adapter to computing devices on the network. In some implementations, the virtual machine 310 and/or the operating system 311 may include the web browser 315. For instance, if there are a plurality of virtual machines executing on the host system, each virtual machine 310 may execute its own copy of the web browser 315. In other implementations, the virtual machine 310 executes a copy of the web browser 315 stored at a network location. In some implementations, the web page generator 307 may execute from the operating system 311.

Still referring to FIG. 3A, memory 302 is shown to include a web browser 315. The web browser 315 may include a user interface, layout engine, rendering engine, script parser, script interpreter, user interface backend, networking component and data persistence component. In some implementations, the web browser 315 may be configured to access the generated first web page and the content item, which may be stored in memory 302 or on the network location. The web browser 315 may load, parse, and render the web page or the HTML document. In some implementations where the web page includes an executable instruction, the web browser 315 may execute the instruction. The web page references the content item, and the web browser 315 may render the display content of the first content item and execute the code of the first content item. In some implementations, the web browser 315 may include browser extensions, plug-ins, function calls, and property. In some implementations, the web browser 315 may be configured to identify the URL of a currently loaded web page.

Still referring to FIG. 3A, memory 302 is shown to include a URL manager 325. The URL manager 325 may execute on top of the operating system 311. In some implementations, the URL manager 325 is part of the web browser 315. In some implementations, the URL manager 325 may be configured to identify the URL of a web page currently loaded on the web browser 315. In some implementations, the URL manager 325 may interface with the operating system 311 and/or the web browser 315 to identify the first URL corresponding to the first web page that is currently loaded on the web browser 315. For instance, the URL manager 325 may resize the window of the web browser 315 and to take a screenshot of the web browser 315 or the navigation bar. In another instance, the URL manager 325 may call a function on the web browser 325 or an extension, plug-in, or other application that returns the currently loaded URL of the web browser 325. The URL manager 325 may save the first URL. The first URL may be saved as text or as image. In implementations where the URL Manager 325 is part of the web browser 315 and the first URL is saved as text, the URL Manager 325 may be a bookmark manager of the web browser 315. The URL manager 325 may include a function call to retrieve the first URL.

Still referring to FIG. 3A, memory 302 is shown to include a timer 330. The timer 330 execute on top of the operating system 311 or the host system. The timer 330 may be an extension or a plug-in of the web browser 315. The timer 330 may be supplied with a predetermined period of time. In some implementations, the predetermined period of time may be supplied by the redirect time estimator 305. In other implementations, the predetermined period of time may be hard coded in an instruction that starts the timer 330. In some implementations, the timer 330 may be an interrupt service. The timer 330 may be configured to start the URL comparer 335 upon the expiry of the predetermined period of time. In some implementations, the web browser 315 may detect that the content item has redirected to a second web page before the expiry of the timer 330. In some implementations, the timer 330 may be reset or deleted and recreated responsive to detecting another URL request made by the web browser 315. In some implementations, the timer 330 may be reset by a traffic monitor. In some implementations, the timer 330 may be reset a maximum number of times. In some implementations, the timer 330 may not be reset after a maximum timer delay time.

Still referring to FIG. 3A, memory 302 is shown to include a URL comparer 335. The URL comparer 335 may execute on top of the operating system 311. The URL comparer 335 may be configured to access the first URL that was stored by the URL manager 325. The URL comparer 335 may identify the second URL from the web browser 315, similar to how the URL manager 325 identified the first URL. In some implementations, the URL comparer 335 is the same module as the URL manager 325. In some implementations, the URL comparer 335 may use the bookmark manager of the web browser 315. The URL comparer 335 may compare the first URL and the second URL. In some implementations, the URL comparer 335 may compare the text or the image. In some implementations, the URL comparer 335 may be configured to look for a single difference between the first and the second URL Still referring to FIG. 3A, memory 302 is shown to include a content item manager 340. In some implementations, the content item manager 340 may execute on top of the operating system 311 or the host system. In some implementations, the content item manager 340 may receive the content item from the web page generator 307, the third-party content provider 102 or the third-party content server 106. In some implementations, the content item manager 340 may trigger the execution of web page generator 307 and the execution of the virtual machine 310. The content item manager 340 may have access to the content item. The content item manager 340 may retrieve the result of the URL comparer 335. The content item manager 340 may update the eligibility of the content item based on the retrieved result. The content item manager 340 may set the content item as ineligible for participation in an online auction performed by the content item selection system 112. The content item manager 340 may mark the content item as in violation of a policy and a corresponding severity value. In some implementations, the content item manager 340 may send the updated content item and ineligibility status to the third-party content server 106. In some implementations, the content item manager 340 may send an update to the third-party content server 106 to update the content item that is stored at the third-party content server 106.

Still referring to FIG. 3A, memory 302 is shown to optionally include a notifier 341. The notifier 341 may execute on top of the operating system 311 or the host system. The notifier 341 may be triggered by the content item manager 340 or the URL comparer 335. The notifier 341 may send an alert to the third-party content provider 102 via the receiver 303. The notifier 341 may send an alert to the third-party content provider 102 via an email, an account notification, a text, a phone call, or any other contact information. The notifier 341 may inform the third-party content provider 102 that the content item violates a policy and that the content item is ineligible for participation in the online auction.

Still referring to FIG. 3A, memory 302 is shown to optionally include a scheduler 345. The scheduler 345 may execute on the host system. The scheduler 345 may be triggered by the URL comparer 335, or the content item manager 340. In some implementations, if the content item was determined to be eligible for participation in the online auction, the scheduler 345 may determine a time when the content item will be rechecked. In some implementations, the scheduler 345 may set an attribute or a property on the content item that marks the time when the content item will be rechecked. In some implementations, the scheduler 345 may interface with a process or a service that periodically checks content items for automatic redirection. In some implementations, the scheduler 345 will determine a rule of when the content will be rechecked, where the rule may be based on a performance metric of the content item. For instance, the rule may specify that the content item will be rechecked after every thousandth impression. In another instance, the rule may specify that the content item will be rechecked when the content item is updated by the third-party content provider 102.

Figure 3B:
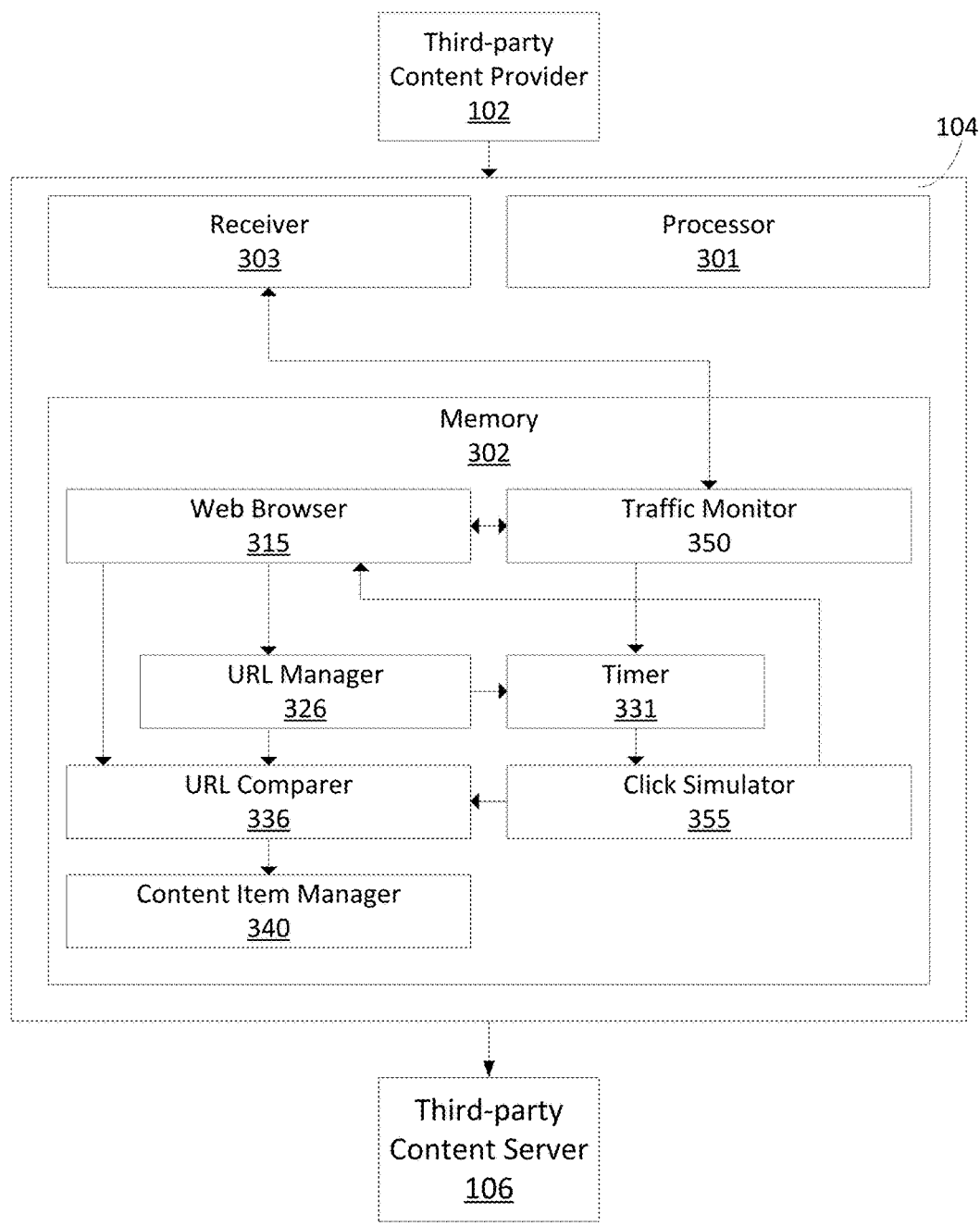
FIG. 3B is a block diagram illustrating another implementation of the content item management system of FIG. 1 in greater detail.

FIG. 3B is a block diagram illustrating another implementation of the content item management system 104 of FIG. 1 in greater detail, shown to include a processor 301, memory 302, and receiver 303, which are described in relation to FIG. 3A. Memory 302 is shown to include the web browser 315, a traffic monitor 350, a URL manager 326, a timer 331, a click simulator 355, a URL comparer 336, and the content item manager 340.

Still referring to FIG. 3B, memory 302 is shown to include a web browser 315, which is described in FIG. 3A. In some implementations, the web browser 315 may also communicate to the receiver 303 via the traffic monitor 350. In some implementations, the web browser 315 may be configured to receive a HTTP response and report to the traffic monitor 350 the URLs that have been received. In some implementations, the web browser 315 may open a web page in a new window, a new tab, or in the same tab/window. In some implementations, the web browser 315 may be configured to prepare a log or a report of first plurality of URLs that have been requested to the URL manager 326.

Still referring to FIG. 3B, memory 302 is shown to include a traffic monitor 350. The traffic monitor 350 may be configured to examine a specified port or a range of ports of a protocol. The traffic monitor 350 may be configured in between the web browser 315 and the receiver 303. In some implementations, the traffic monitor 350 may be an extension, a plug-in, etc. of the web browser 315. In some implementations, the traffic monitor 350 may examine inbound and/or out-bound traffic data.

Still referring to FIG. 3B, memory 302 is shown to include a URL manager 326, which may be similar to the URL manager 325 described in relation to FIG. 3A. The URL manager 326 may store a plurality of first URLs, and the plurality of first URLs may be received from the web browser 315 or the traffic monitor 350. In some implementations, the URL manager 326 may order plurality of first URLs and store it in memory. In some implementations, the URL manager 326 may save the plurality of first URLs as text files. The plurality of first URLs may be saved in association with the content item. The URL manager 326 may include a function call to retrieve one or more of the plurality of first URLs.

Still referring to FIG. 3B, memory 302 is shown to include a timer 331, which may be similar to the timer 330 described in relation to FIG. 3A. The timer 331 may be initialized by the URL manager 326 or the web browser 315 when the first web page has been rendered. In some implementations, the timer 331 may be deleted, or reset by the traffic monitor 350 when another request is sent or another response is received. The timer 331 may also include a count of number of times it has been killed or reset, which is compared against a maximum number of times it may be reset. The timer 331 may also include a maximum predetermined period of time, which is compared against the time elapsed since the timer is first initialized. In some implementations, the click simulator 355 may be triggered based on the comparison.

Still referring to FIG. 3B, memory 302 is shown to include a click simulator 355, which may be connected to the web browser 315 or is an extension, a plugin, etc. of the web browser 315. The click simulator 355 may be configured to determine coordinates of an area within the content item. The click simulator 355 may use the determined coordinates to trigger a mouse click event and open a second web page in the web browser 315, in the new window, a new tab, or in the same tab/window.

Still referring to FIG. 3B, memory 302 is shown to include a URL comparer 336, which may be similar to the URL comparer 335 described in relation to FIG. 3A. The URL comparer 336 may receive or retrieve the plurality of first URLs from the URL manager 326. The URL comparer 336 may also receive or retrieve the second URL from the web browser 315. The URL comparer 336 may compare the second URL to each of the plurality first URLs. The URL comparer 336 may also modify the URLs before the comparison.

Still referring to FIG. 3B, memory 302 is shown to include the content item manager 340, which is described in relation to FIG. 3A. The content item manager 340 may set the severity value associated with the content item based on how the redirect was detected.

Figure 4:
FIG. 4 is a block diagram illustrating a web page and a content item structure.

FIG. 4 is a block diagram illustrating a web page 400 and a content item 405 structure. The content item 405 may include display content 410 and code 415. The web page 400 may be a HTML document or any other resource. The web page 400 may reference the content item 405. In some implementations, the web page 400 may also reference the display content 410 and/or the code 415. The web page 400 may include additional instructions that, when executed, may detect when the browser has been redirected or when the URL of the browser has changed.

The content item 405 includes a display content 410 and code 415. When the content item 405 is served to a device, the device may load the content item 405, render the display content 410, and execute the code 415. The content item 405 may specify the format or type of the display content 410, which may be text, image, audio, video, multimedia etc. The content item 405 may be a banner content item, interstitial content item, pop-up content item, rich media content item, hybrid content item, Flash® content item, cross-domain iframe content item, etc. The code 415 may be written in any programming or scripting language that can be executed on a device. The code 415 may be embedded information such as hyperlinks, metadata, links, machine-executable instructions, annotations, etc. The code 415 may indicate a landing page URL that specifies a web page or a resource to which the browser will be redirected. The code 415 may include embedded instructions, and/or machine-executable code instructions. The code 415 may be executed by the web browser when the display content 410 is displayed on the web browser. In some implementations, the code 415 may be attached to the display content 410 so that the web browser may execute the code 415. In some implementations, the code 415 may be attached to an invisible one-by-one pixel, which may be used to store various parameters used by the code 415. The code 415 may perform various functions. In some implementations, the code 415 may also be executed to perform various functions. For instance, if the display content 410 is a video, the code 415 may keep track of the resolution quality, volume, the current frame of the video, and whether the video has finished playing. The code 415 may also display a countdown timer at the end of which a link to skip the rest of the video or close the ad is displayed. In another instance, if the display content 410 is an interactive multimedia, the code 415 may take inputs from an input device of the device, track score of the device, and/or display additional images. The code 415 may set or read cookies on the web browser. In some instances, the code may redirect the device to a landing page without user interaction or when receiving an input from the device. The code 415 may include information about the third-party content provider, such as account information or an identifier of a campaign or a set of content items provided by the third-party content provider.

Figure 5A:
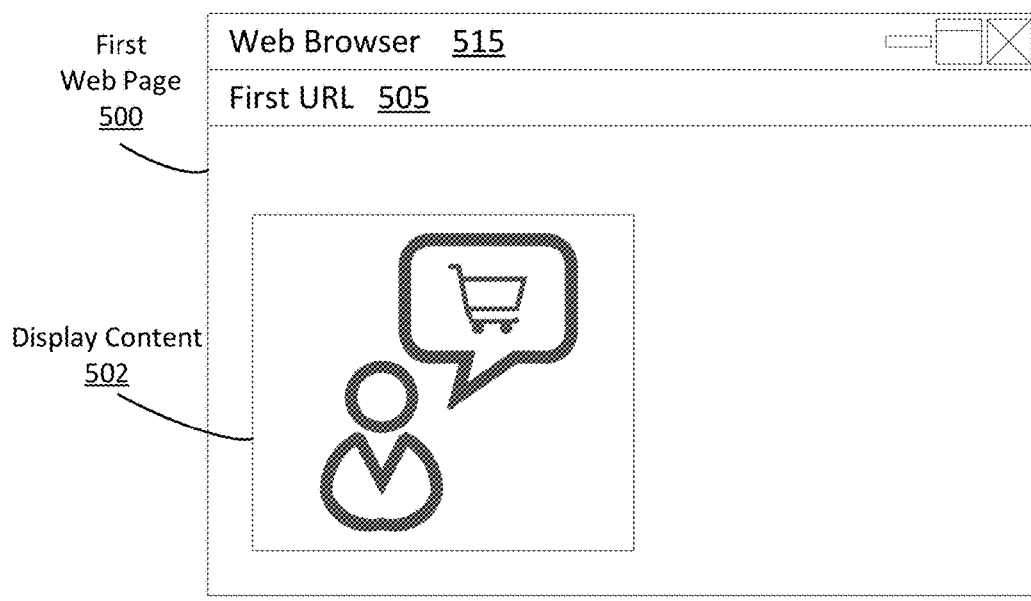
FIG. 5A is an illustrative web page displayed with a content item.

FIG. 5A is an illustrative web page displayed with a content item. The web browser 515 may display a navigation bar that displays the first URL 505 and the first web page 500. The web browser 515 displaying the first web page 500 include displaying the display content 502 of the content item. The display content 502, as shown in this illustrative web page, is an image content. The web browser 515 may be executing code that is included in the content item but may not show the code in the browser window.

Figure 5B:
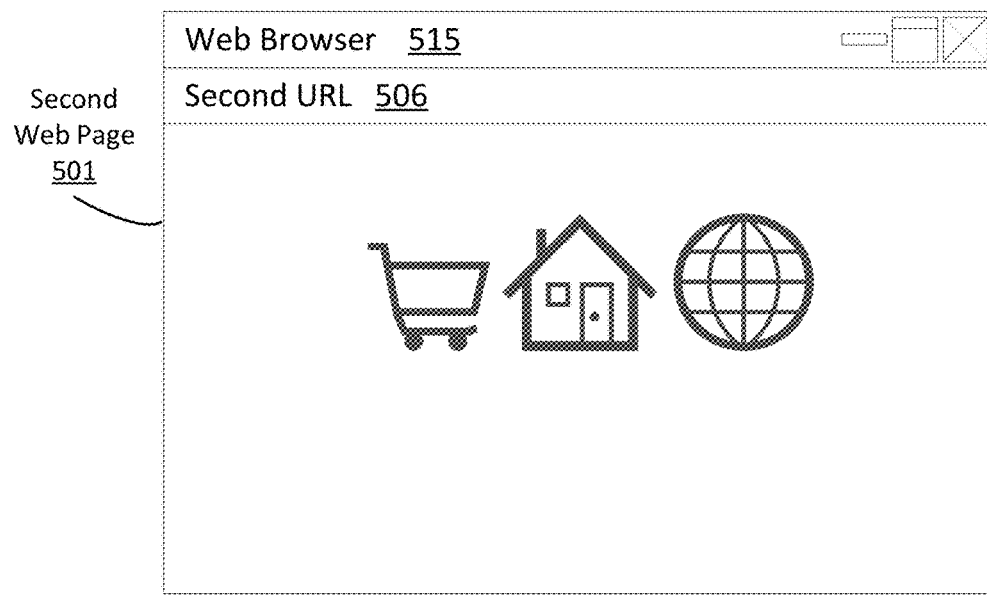
FIG. 5B is an illustrative web page displayed automatically.

FIG. 5B is an illustrative web page displayed automatically. In this illustration, the content item may have redirected the web browser 515 to a second web page 501 that is identified by the second URL 506. The navigation bar may display the second URL 506. The second web page 501 may be hosted on a resource server. In some implementations, the content item may redirect only a portion of the web page.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including a programmable processor, a computer, a system on a chip, or multiple ones, or combinations, of the foregoing. The apparatus may include special purpose logic circuitry, e.g., a field programmable gate array (FPGA) or an application-specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices semiconductor memory devices (e.g., EPROM, EEPROM, and flash memory devices; magnetic disks, e.g., internal hard disks or removable disks; magneto-optical disks; and CD-ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for instance, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for instance, by sending web pages to a web browser on a user's device in response to requests received from the web browser.

Implementations of the subject matter described in this disclosure may be implemented in a computing system that includes a back-end component (e.g., as a data server), or that includes a middleware component (e.g., an application server), or that includes a front-end component (e.g., a client computer) having a graphical user interface or a web browser through which a user may interact with an implementation of the subject matter described in this disclosure, or any combination of one or more such back-end, middleware, or front-end components. The components of the system may be interconnected by any form or medium of digital data communication (e.g., a communication network). Communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

Thus, particular implementations of the subject matter have been described. Other implementations are within the scope of the following claims. In some cases, the actions recited in the claims can be performed in a different order and still achieve desirable results. In addition, the methods depicted in the accompanying figures do not necessarily require the particular order shown, or sequential order, to achieve desirable results. In certain implementations, multitasking and parallel processing may be advantageous.

What is claimed is:

1. A computer-implemented method for checking for redirection of content items, the method comprising:
   identifying, on a client device, a plurality of redirect times from a set of redirecting content items that are configured to redirect a browser;
   determining a threshold period of time as a maximum of the plurality of redirect times;
   rendering, on the client device, a first web page identified by a first uniform resource locator (URL) in the browser, the first web page comprising a first content item;
   storing the first URL in a memory element on the client device;
   identifying, by the client device and after the threshold period of time elapses, a second URL associated with a second web page rendered by the browser; comparing the first URL to the second URL;
   based on the comparing, determining that the first URL and the second URL are not the same;
   classifying, based on determining that the first URL and the second URL are not the same, the first content item as violating an automatic redirection policy; and
   identifying the first content item as ineligible for participation in an online auction system based on the classification.

2. The method of claim 1, further comprising generating the first web page comprising the first content item before rendering the first web page.

3. The method of claim 1, wherein rendering the first web page comprises:
   loading a virtual machine comprising an operating system and the browser.

4. The method of claim 1, wherein rendering the first web page further comprises rendering the first content item comprising a display content and code, by rendering the display content and executing the code.

5. The method of claim 1, wherein identifying the second URL comprises identifying, after the threshold period of time elapses, the second URL from one of a navigation bar of the browser rendering the second web page, a browser extension, a plug-in, a function call, or a property.

6. The method of claim 1, further comprising alerting a provider providing the first content item of a policy violation.

7. The method of claim 1, further comprising:
   searching for redirection in the first content item via static code analysis of code included in the first content item; and
   wherein rendering the first web page comprises rendering the first web page identified by the first URL responsive to failing the search.

8. The method of claim 1, further comprising rechecking the first content item for redirection based on a change in the first content item or an elapse of a periodic timer, a period of the timer based on a predetermined value or a performance metric of the first content item.

9. A computer-implemented system for checking for redirection of content items, the system comprising:
   one or more processors; and
   one or more memory elements including instructions that when executed cause the one or more processors to:

identify, on a client device, a plurality of redirect times from a set of redirecting content items that are configured to redirect a browser;

determine a threshold period of time as a maximum of the plurality of redirect times;

render, in the browser, a first web page identified by a first uniform resource locator (URL), the first web page comprising a first content item;

store the first URL in a memory element on the client device;

identify, by the client device and after the threshold period of time elapses, a second URL associated with a second web page rendered by the browser;

compare the first URL to the second URL;

based on the comparing, determine that the first URL and the second URL are not the same;

classify, based on determining that the first URL and the second URL are not the same, the first content item as violating an automatic redirection policy; and identify the first content item as ineligible for participation in an online auction system based on the classification.

10. The system of claim 9, wherein the instructions, when executed, cause the one or more processors to generate the first web page comprising the first content item before rendering the first web page.

11. The system of claim 9, wherein the instructions, when executed, cause the one or more processors to load a virtual machine comprising an operating system and the browser.

12. The system of claim 9, wherein the browser rendering the first web page further comprises rendering the first content item comprising a display content and code, by rendering the display content and executing the code.

13. The system of claim 9, wherein identifying the second URL comprises identifying, after the threshold period of time elapses, the second URL from one of a navigation bar of the browser rendering the second web page, a browser extension, a plug-in, a function call, or a property.

14. The system of claim 9, wherein the instructions, when executed, cause the one or more processors to alert a provider providing the first content item of a policy violation.

15. The system of claim 9, wherein the instructions, when executed, cause the one or more processors to search for redirection in the first content item using static code analysis of code included in the first content item; and wherein the browser rendering the first web page comprises rendering the first web page responsive to the static code analysis module failing the search.

16. The system of claim 9, wherein the instructions, when executed, cause the one or more processors to set a schedule associated with the first content item specifying when to recheck the first content item for redirection, the schedule based on a change in the first content item or an elapse of a periodic timer, a period of the timer based on a predetermined value, or a performance metric of the first content item.

* * * * *